Figure 1:
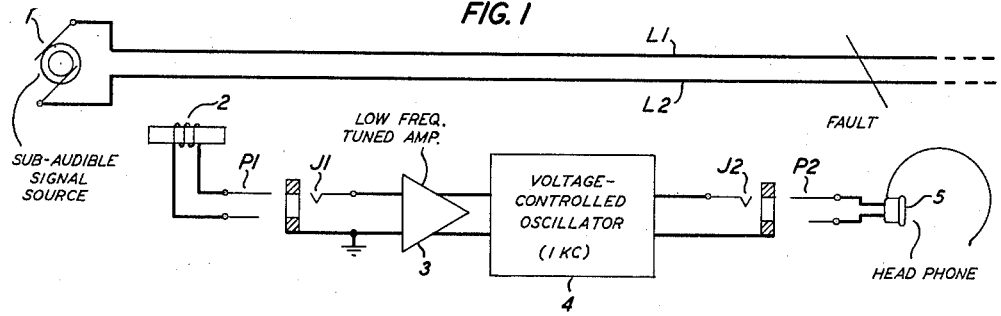

Sept. 1, 1953   J. B. HAYS, JR   2,651,021
FAULT DETECTOR
Filed April 20, 1951

INVENTOR
J. B. HAYS, JR.
BY
Walter M. Hill
ATTORNEY

Patented Sept. 1, 1953

2,651,021

UNITED STATES PATENT OFFICE 2,651,021

FAULT DETECTOR

James B. Hays, Jr., Summit, N. J., assignor to Bell Telephone Laboratories, Incorporated, New York, N. Y., a corporation of New York Application April 20, 1951, Serial No. 222,004

8 Claims. (Cl. 324—52)

This invention relates to testing systems and more particularly to an improvement in apparatus for locating faults in electrical cables.

A method of locating faults which has been in use for a good many years consists of placing a tracer or "tone" source comprising a source of alternating current of audible frequency on the faulted conductors of a cable and locating the exact point of the fault by following along the cable with an electrical pick-up device capable of detecting a change in signals radiated from the faulted conductors. When the pick-up device passes beyond the fault a drop in the fault current causes a change in pick-up voltage thereby making it possible to locate the fault. Apparatus capable of performing this test method is represented by United States Patent 925,594 granted June 22, 1909, to W. O. Pennell and H. L. Hoffmann and by United States Patent 1,170,017 granted February 1, 1916, to H. M. Stoller. Subsequently a considerable variety of tracer currents operating at different frequencies including modulated tracer currents and a variety of detection apparatus have been developed and used.

One form of apparatus which has been in considerable use in the telephone plant in recent years comprises a ringing generator of 20 cycles per second for supplying the tracer current to the faulted conductors. The pick-up device comprises an exploring coil, a tuned amplifier, a rectifier and direct-current microammeter which gives a visual indication of the pick-up of the exploring coil carried along the faulted cable in search of the fault. The low, subaudible frequency of 20 cycles per second is used to minimize attenuation of the tracer current and also to minimize the effect of the "carry-over" inherent in long cables.

When using this apparatus near 25 cycles per second power lines, insufficient discrimination between the tracer current frequency and the power frequency exists to obtain a positive location of the fault. It, therefore, becomes necessary to use a tracer current frequency sufficiently different from the frequency of the power line to provide the necessary discrimination for accurate fault location. Increasing the frequency increases the "carry-over" effect since the capacity reactance between the conductors decreases with frequency and, therefore, the change in current in the line from one side of the fault to the other is not sufficiently great to offer the required discrimination. This is especially true where the fault is of relatively high resistance. Consequently, it is desirable that the frequency be lowered to a value below the usual 20 cycles per second. It has been found that a frequency of 10 cycles per second is satisfactory and provides adequate discrimination against currents of 25 cycles per second power line frequency. This frequency is also a subaudible frequency and ordinarily would require the use of a meter or similar indicating device for indicating the fault current.

When a meter is used, two operators are sometimes required because in such cases one operator cannot keep his eyes on the meter and at the same time watch the movement of the exploring coil. In order to make the apparatus portable and easily used by one person it is desirable that the detection device be of the audible type as for example to include a telephone receiver. Thus two apparently mutually inconsistent requirements should be met; a subaudible tracer current must be used and an audible output should be derived.

It is an object of this invention to provide an improved portable fault locating apparatus preferably capable of use by one person in which the tracer current is of a subaudible frequency and the signal heard by the operator is of a frequency easily detected by the ear.

The foregoing object is achieved by this invention which provides a fault locating detector unit for locating cable faults comprising a pick-up device capable of receiving the electromagnetic energy radiated from the cable due to the flow of a tracer current and a tuned amplifier to transmit the tracer current picked up by the pick-up device. An oscillator is normally blocked from oscillation and a circuit means connects the amplifier to the oscillator whereby any detected fault current which exceeds a predetermined minimum value will start and maintain the oscillator in operation. An indicating means is connected to receive and to respond to energy from the oscillator.

Figure 2:
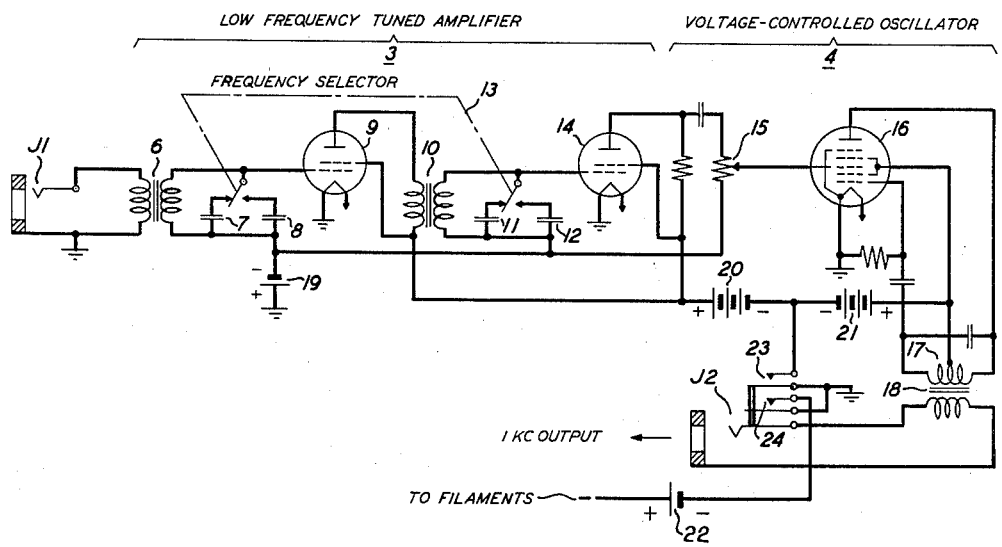
Figure 3:
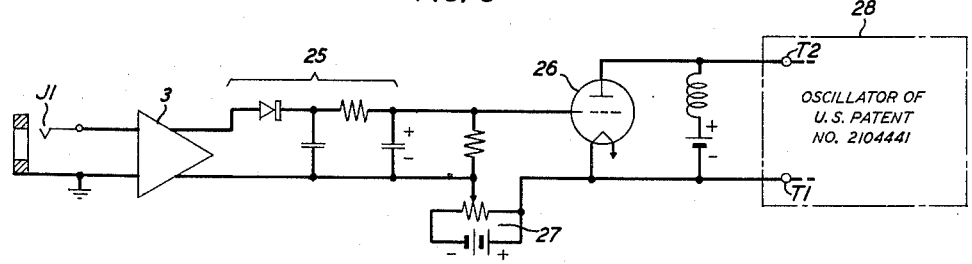

The invention may be better understood by referring to the accompanying drawings in which:

Fig. 1 is a block diagram illustrating a typical system embodying this invention;

Fig. 2 discloses preferred forms of circuits of the low frequency tuned amplifier and the voltage controlled oscillator portions of Fig. 1 which constitute an improvement over the prior art; and Fig. 3 is illustrative of a modification of Fig. 2 disclosing a different type oscillator controlled by a change in impedance rather than a change in voltage.

In Fig. 1 the subaudible signal source comprising an alternating-current generator 1 is connected to a pair of faulted conductors L1 and L2 in accordance with conventional practice. It will be understood that a current will flow around the circuit from the generator through line L1, through the fault schematically illustrated by a line crossing the two conductors and back to the generator by way of conductor L2. In addition to the current flowing through the fault, it will also be understood that an additional current will flow due to the distributed capacitance between conductors. It is apparent that if the fault has appreciable resistance there will be capacity current flowing through the conductors on the side of the fault remote from the generator as well as on the generator side. This current is a function of frequency and increases as the frequency is increased. The "carry-over" effect previously mentioned is caused by this current and it is, therefore, evident that as the frequency is lowered to the subaudible range and especially if it is lowered to around 10 to 20 cycles per second as herein proposed, this current, in the case more commonly met in practice, will become sufficiently small compared with the fault current that it can be distinguished from the fault current.

An exploring coil 2 is carried along the faulted conductors and has induced therein a voltage determined by both the fault current and the above-described capacity current flowing in the faulted conductors. The current picked up by the exploring coil reduces in value as the exploring coil passes beyond the fault. The amount by which it reduces is dependent upon the extent of the "carry-over" effect. As was previously indicated, it is a known fact that when the frequency of the signal source is in the subaudible range this "carry-over" effect is reduced sufficiently to enable the detection apparatus to discriminate between the currents on the two sides of the fault.

As shown in Fig. 1, the exploring coil 2 is connected to the input circuit of a low frequency tuned amplifier 3 by way of a plug-jack combination P1 and J1. The output of amplifier 3 is connected to the control circuit of a voltage controlled oscillator 4. A preferred form of this oscillator will be described in greater detail in connection with Fig. 2. However, for the moment it may be stated that this oscillator has a frequency preferably in the audio range and is adapted to be normally blocked from oscillation. Whenever the output voltage from amplifier 3 exceeds a predetermined limit oscillator 4 will begin oscillating. Hence, the subaudible frequency picked up by exploring coil 2 will cause the oscillator 4 to produce an audible frequency of easily detected intensity the frequency of which may preferably be of the order of one kilocycle. The output from oscillator 4 is heard in telephone receiver 5 which is connected to the oscillator through a plug-jack combination P2, J2.

By using an audio frequency oscillator of the type indicated above, it is found that two outstanding advantages are realized. First, a telephone receiver can be used to detect the presence of the fault signal thereby making it possible for one person to operate the entire receiving equipment. Not only is an economy achieved in the number of operators required but one operator can handle the probe with greater facility if he also receives the detected signal directly from the apparatus rather than having it relayed to him by another operator. The second advantage is that still better discrimination against "carry-over" is achieved. The oscillator may be adjusted by means hereinafter more fully described to just begin oscillating at an easily observed level for a signal current received from the generator side of the fault. Consequently, when the exploring coil 2 passes beyond the fault, the signal level is below this critical predetermined limit and the oscillator immediately ceases oscillating. This greatly increases the accuracy with which the fault may be located because it provides greater discrimination between the currents on the two sides of the fault.

A preferred form of the low frequency tuned amplifier 3 is shown in Fig. 2 as having a first stage comprising tube 9 and a second stage comprising tube 14. The first stage is connected from jack J1 through a transformer 6 to the input circuit of tube 9. The secondary of the input transformer 6 is tuned by means of either condenser 7 or condenser 8 depending upon the frequency to which it is to be tuned, for example, 10 cycles per second or 20 cycles per second. The output circuit of tube 9 is transformer coupled to the input circuit of tube 14 by means of transformer 10. The secondary of transformer 10 is tuned by means of capacitors 11 and 12. A two-position double pole switch 13 is connected to capacitors 7, 8, 11 and 12 and is arranged to connect either capacitors 7 and 11 or capacitors 8 and 12 across their respective secondaries. It is to be understood that capacitors 7 and 11, for example, may tune the transformers to 10 cycles per second, whereas capacitors 8 and 12 may tune them to 20 cycles per second. When tuned to 10 cycles per second it has been found that this amplifier will provide ample discrimination against currents of 25-cycle power frequency.

The alternating-current output from tube 14 is connected to the signal grid of the pentagrid converter tube 16 through a potentiometer 15. It will be observed that the anode, the No. 1 grid and the cathode are connected to the tuned circuit 17 in such a manner as to constitute a conventional Hartley type oscillator. The oscillations of such an oscillator may be stopped by providing a small negative bias to the signal grid connected to potentiometer 15. This may be supplied by a fixed bias source 19. While this source has been shown fixed, it is obvious that it may be made variable and used instead of potentiometer 15 as a means for adjusting the signal level at which the oscillator may start operating. This source is also shown in Fig. 2 as a fixed bias for tubes 9 and 14 in the tuned amplifier, the circuit path for which is conventional and obvious. Plate current for the two amplifier tubes is provided by a battery 20 and the plate current for the oscillator is provided by a battery 21. The output from the oscillator 16 is obtained from the secondary of transformer 18 by way of jack J2. It will be noted that when a plug is inserted in this jack, filament power is supplied to tubes 9, 14 and 16 from source 22 through contacts 24 while at the same time contacts 23 provide plate current to the tubes from batteries 20 and 21.

It was previously indicated that bias source 19 is of sufficient magnitude to prevent tube 16 from oscillating. Potentiometer 15 may be adjusted so that the positive peaks of the alternating voltage from tube 14 will overcome the bias of source 19 sufficiently to permit tube 16 to intermittently oscillate at each voltage peak of the low frequency received from the tuned amplifier. By holding the exploring coil 2 on the generator side of the fault, potentiometer 15 should be adjusted until oscillator 16 begins to oscillate as determined by listening to the output from receiver 5 connected to jack J2. As the exploring coil 2 is moved just beyond the fault, the fault current completely disappears. Since the capacity current producing the "carry-over" effect is below the critical level to which potentiometer 15 was adjusted, it is insufficient to permit the oscillator to oscillate. The oscillator tone thereby suddenly disappears in the telephone receiver to provide a positive location of the fault.

It has been found that this invention greatly increases the accuracy with which the fault may be located by reason of its greater discrimination against both the "carry-over" effect and currents of power line frequencies.

While in the preferred embodiment of Fig. 2 an oscillator of the Hartley type was disclosed, other types of oscillators may be substituted. For example, the relaxation type oscillator shown in United States Patent 2,475,827 granted July 12, 1949, to H. M. Evjen may be directly substituted by merely connecting conductors 13 and 15 of the Evjen patent to potentiometer 15 of Fig. 2 of this application. Adjustment of the critical voltage permitting oscillation may thereby be achieved by either adjusting the variable bias adjustment of the Evjen disclosure or by adjusting potentiometer 15 of this application or by a combination of both.

United States Patent 2,104,441 granted January 4, 1938, to F. F. Stratford discloses an oscillator, the oscillations of which are under control of a resistance. Whenever the resistance is lower than a critical limit the oscillator will oscillate. When the resistance exceeds this limit oscillation stops.

Fig. 3 discloses how the oscillator circuit of the Stratford patent may be employed in the practice of this invention. The output of the tuned amplifier 3 is rectified and filtered by a conventional rectifier and filter combination 25. This will produce a direct voltage tending to increase the grid bias of a tube 26 in the positive direction. An adjustable bias source 27, normally biasing the grid of tube 26 to near cut-off, is overcome by the rectified output from rectifier 25 thereby considerably lowering the internal space impedance of tube 26. The plate of tube 26 may be supplied by power through a conventional choke coil as schematically illustrated. The plate and cathode of tube 26 are connected to terminals T1 and T2 in block 28 which correspond to terminals T1 and T2 of the disclosure in the Stratford patent. The transformation ratio of transformer 25 of the Stratford patent disclosure should be changed to match the impedance of tube 26. It is evident that as tube 26 lowers in impedance, oscillation will begin as described in the Stratford patent. In using this arrangement the exploring coil 2 is held on the generator side of the fault as before and bias source 27 is adjusted until oscillation just begins. It will then be obvious that as the exploring coil 2 is moved beyond the fault the impedance of tube 26 will considerably increase thereby stopping oscillation.

It is to be understood that the above-described arrangements are illustrative of the application of the principles of the invention. Numerous other arrangements may be devised by those skilled in the art without departing from the spirit and scope of the invention. To practice the invention it is preferred that a subaudible signal source be employed of sufficiently low frequency to avoid interference with currents of power line frequencies and also to avoid excessive "carry-over" effect. The receiving device should be tuned to the frequency of the signal source and an oscillator normally blocked from oscillation should be employed having a frequency well into the audible range, preferably around one kilocycle.

What is claimed is:

1. Means for locating cable faults in cable conductors carrying an alternating tracer current, comprising a pick-up means adapted to receive electromagnetic energy radiated from said cable due to the flow of said tracer current, an amplifier tuned to transmit current of the frequency of said tracer current, an input circuit for said amplifier connected to the pick-up means to receive and amplify the energy picked up, an output circuit for the amplifier, an oscillator having a means adapted to normally stop the oscillations thereof, a circuit connecting said means and the amplifier output circuit to the oscillator, said circuit being so constructed and arranged as to cause the oscillator to oscillate only as the amplified energy exceeds a predetermined limit, and an indicating means connected to the oscillator and responsive to the oscillations thereof.

2. Means for locating cable faults in cable conductors carrying an alternating tracer current, comprising a pick-up means adapted to receive electromagnetic energy radiated from said cable due to the flow of said tracer current, an amplifier tuned to transmit current of the frequency of said tracer current, an input circuit for said amplifier connected to the pick-up means to receive and amplify the energy picked up, an output circuit for the amplifier, an oscillator having a means adapted to normally stop the oscillations thereof, a circuit connecting the amplifier output circuit to the oscillator, said circuit including means for disabling said oscillation stopping means and being so constructed and arranged as to cause said oscillator to oscillate only as the amplified energy exceeds a predetermined limit, and an indicating means connected to the oscillator and responsive to the oscillations thereof.

3. Means for locating cable faults in cable conductors carrying an alternating tracer current, comprising a pick-up means adapted to receive electromagnetic energy radiated from said cable due to the flow of said tracer current, an amplifier tuned to transmit current of the frequency of said tracer current, an input circuit for said amplifier connected to the pick-up means to receive and amplify the energy picked up, an output circuit for the amplifier, an oscillator having a bias means adapted to normally stop the oscillations thereof, a circuit connecting said bias means and the amplifier output circuit to the oscillator, said circuit being so constructed and arranged as to cause said oscillator to oscillate only as the amplified energy exceeds said bias, and an indicating means connected to the oscillator and responsive to the oscillations thereof.

4. Means for locating cable faults in cable conductors carrying an alternating tracer current, comprising a pick-up means adapted to receive electromagnetic energy radiated from said cable due to the flow of said tracer current, an amplifier tuned to transmit current of the frequency of said tracer current, an input circuit for said amplifier connected to the pick-up means to receive and amplify the energy picked up, an output circuit for the amplifier, an oscillator comprising a vacuum tube having a grid and a voltage bias source connected to the grid to normally stop oscillations, a circuit connecting said bias source and the amplifier output circuit in series to said oscillator grid whereby said oscillator will oscillate only as the amplified energy reduces the bias voltage below a predetermined limit, and an indicating means connected to the oscillator and responsive to the oscillations thereof.

5. The apparatus in accordance with claim 1 wherein said alternating tracer current is of subaudible frequency, said oscillator is of audible frequency, and said indicating means comprises a telephone receiver.

6. The combination in accordance with claim 2 wherein said alternating tracer current is of subaudible frequency, said oscillator is of audible frequency, and said indicating means comprises a telephone receiver.

7. The combination in accordance with claim 3 wherein said alternating tracer current is of subaudible frequency, said oscillator is of audible frequency, and said indicating means comprises a telephone receiver.

8. The combination in accordance with claim 4 wherein said alternating tracer current is of subaudible frequency, said oscillator is of audible frequency, and said indicating means comprises a telephone receiver.

JAMES B. HAYS, Jr.

References Cited in the file of this patent

UNITED STATES PATENTS

| Number | Name | Date |
| --- | --- | --- |
| 1,462,053 | Stoller | July 17, 1923 |
| 1,902,234 | Heintz | Mar. 21, 1933 |

OTHER REFERENCES

"Bell Labs Record," article by Henneberger, April 1946, pages 145–147.